No. 782,555. PATENTED FEB. 14, 1905.
S. W. GOOCH.
HOSE COUPLING.
APPLICATION FILED APR. 2, 1904.
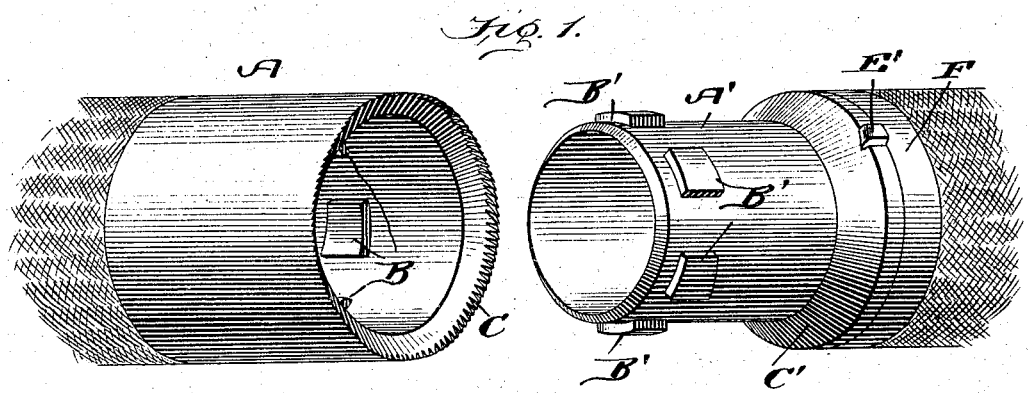
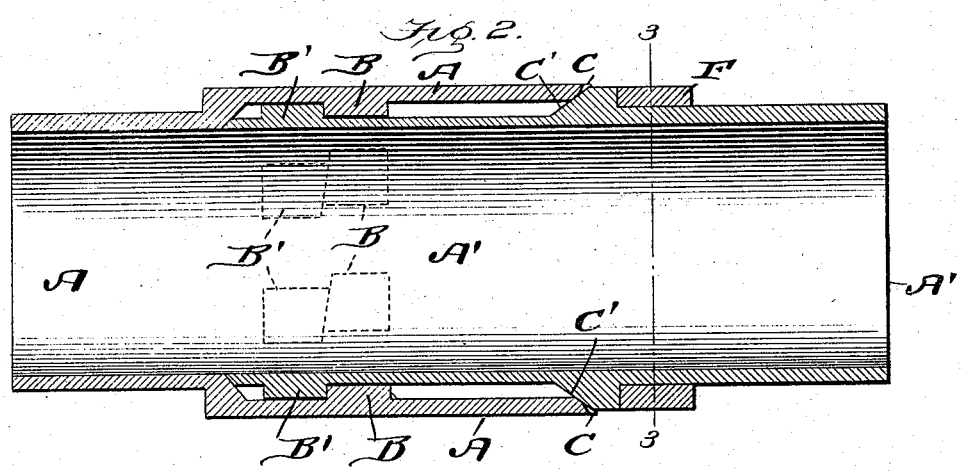
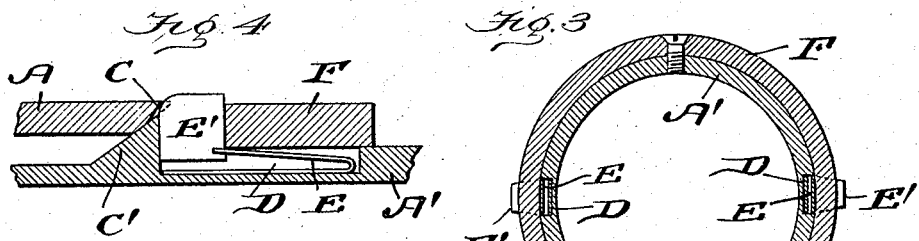
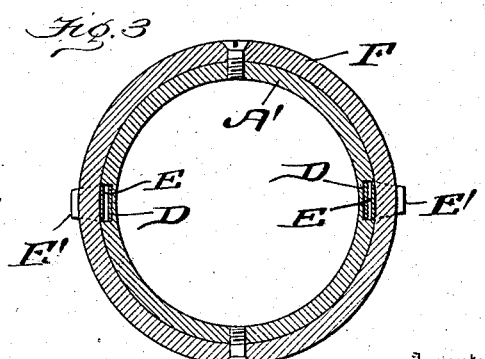
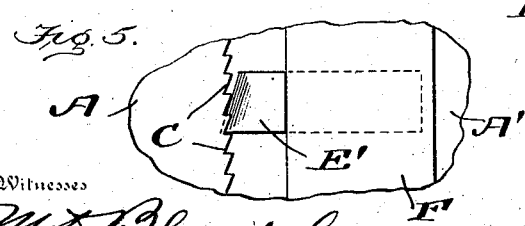
Witnesses
M. Blondel,
Edgar B. McBath.
Inventor
S. W. Gooch,
By Brown & Brock
Attorneys No. 782,555. Patented February 14, 1905.

UNITED STATES PATENT OFFICE.

SHADRACK W. GOOCH, OF BRILLIANT, OHIO.

HOSE-COUPLING.

SPECIFICATION forming part of Letters Patent No. 782,555, dated February 14, 1905.

Application filed April 2, 1904. Serial No. 201,297.

*To all whom it may concern:*

Be it known that I, SHADRACK W. GOOCH, a citizen of the United States, residing at Brilliant, in the county of Jefferson and State of Ohio, have invented a new and useful Hose-Coupling, of which the following is a specification.

My invention relates to hose-coupling, and is adapted for use in connection with water, steam, or compressed-air pipes. While the device may be used wherever a coupling may be necessary, yet it is especially adapted for temporarily coupling pipe-sections together by reason of the ease with which the connection may be made and the equal ease with which the sections may be uncoupled. The device is therefore especially adapted for use with fire-engine hose, in mines, and in connecting sections of hose conveying compressed air to pneumatic drills and other tools.

My invention consists of the novel features of construction hereinafter described, particularly pointed out in the claims, and shown in the accompanying drawings, in which—

Figure 1 is a perspective view of my coupling, the two coacting parts being shown detached. Fig. 2 is a longitudinal section through the coupler, the two coacting members being coupled together. Fig. 3 is a section on the line 3 3 of Fig. 2. Fig. 4 is a detail view partly in section and showing the spring-actuated dog in elevation. Fig. 5 is a detail plan view showing the dog.

My coupler is formed of two cylindrical sections A and A', the former being adapted to be telescoped by the latter. On the inner face of the section A is formed, arranged in a ring-like form, a plurality of lugs or inwardly-extending projections B, spaced apart. The rear edges of these lugs are arranged at an angle to a true circumferential line drawn around the cylinder A and may for convenience be termed "beveled."

On the exterior of the section A', which is of less diameter than the bore of the section A, is formed projections or lugs B', having their rear edges beveled or angled in the opposite direction to the angle of inclination in the lugs B. The lugs B' are also spaced apart in the same manner as are the lugs B. At its forward end the cylinder A is beveled, and on the edge of the bevel ratchet-teeth C are formed, as is most clearly shown in Figs. 1 and 5.

A shoulder C' is formed on the cylindrical section A', and the forward face of the shoulder C' is beveled to coact with the beveled free end of the section A, the portion of the section A' in advance of the shoulder C' telescoping into the section A. On opposite sides of the section A' and immediately to the rear of the shoulder C' are formed longitudinally-extending grooves D, and the shoulder C' is also recessed to communicate with these grooves, the grooves and the recesses of the shoulders being continuous with reference to each other. In each groove is arranged a flat spring E, bent back upon itself, and at its upper free end the spring carries a dog E', the forward upper face of which is beveled and also angled to coact with the teeth C. To retain the springs E in place and to guide the dogs E' in their outward and inward movement, a ring F is fitted over the coupling-section A' and bears against the rear edge of the shoulder C' and also covers the grooves D.

It is thought that the operation of the device will be obvious. The section A' is inserted into the section A, the lugs B' passing between the lugs B until they rest in the rear of the said lugs B, by which time the shoulder C' will be in contact with the beveled face of the section A, having the teeth C, which teeth are slightly above the shoulder, owing to the fact that the exterior diameter of the forward end of the section A is slightly greater than the exterior diameter of the shoulder C'. The parts being in the position described, the section A' is rotated right-handedly with reference to the section A, and the inclined or angled faces of the lugs B and B' are brought into engagement and the section A' is held firmly from withdrawal, and the opposite angling of the lugs B and B' give a wedge-like effect, making a very tight joint, so that the teeth C are held in firm engagement with the dogs E', the said dogs preventing reverse rotation of the section A'. To uncouple the sections, it is only necessary to press the dogs inwardly, and the dogs sinking into the recess are disengaged from the teeth C. A slight turn to the left then disengages the angled faces of the lugs B B', and the section A' can be at once withdrawn from the section A.

Having thus fully described my invention, what I claim as new, and desire to secure by Letters Patent, is—

1. A sectional coupling having telescopic sections carrying interlocking lugs, one of the said sections having a beveled end, ratchet-teeth formed on the edge of said bevel, a shoulder formed on the coacting section and beveled to fit the beveled end carrying the teeth, said shoulder being recessed, a dog adapted to work in said recess and engage the ratchet-teeth, and a spring adapted to actuate the dog.

2. A coupling comprising a section having lugs formed on its inner face, one end of the said section being beveled, ratchet-teeth formed on the said beveled end, a section adapted to slide within the first-mentioned section and having lugs formed on its exterior, the said lugs being adapted to pass between the lugs carried by the first-mentioned section, a shoulder on the second-mentioned section adapted to engage the beveled end of the first-mentioned section, grooves formed in the rear of the said shoulder, springs in the grooves, the said grooves opening into recesses formed in the shoulder, and dogs adapted to move in the recesses of the shoulder and engage the teeth of the first-mentioned section, the springs bearing on the said dogs, as and for the purpose set forth.

3. A coupling of the kind described comprising pipe-coupling sections A and A', the section A' being adapted to have a limited movement within the section A, lugs spaced apart carried by the interior face of the section A, lugs spaced apart carried by the exterior face of the section A' and adapted to pass between the lugs of the section A, an annular ring of serrated teeth carried by the section A, a recessed shoulder carried by the section A', the section A' being grooved in the rear of the recesses of the shoulder, the forward ends of the grooves communicating with the recesses, springs in the grooves, dogs carried by the springs and adapted to project above the shoulder, said dogs working in the recesses of the shoulder, and adapted to engage the teeth of the section A, and a ring adapted to fit over the section A' in the rear of the shoulder and cover the grooves, as and for the purpose specified.

SHADRACK W. GOOCH.

Witnesses:
JESSIE GOOCH,
CALVIN CROOKS.